(12) United States Patent
Katz et al.

(10) Patent No.: US 7,925,952 B1
(45) Date of Patent: Apr. 12, 2011

(54) DISTRIBUTED MIDLET TESTING

(75) Inventors: Ron Katz, Moshav Elyachin (IL); Victor Rosenman, Santa Clara, CA (US); Yaniv Vakrat, Santa Clara, CA (US); Omer Pomerantz, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1407 days.

(21) Appl. No.: 11/391,810

(22) Filed: Mar. 28, 2006

Related U.S. Application Data (60) Provisional application No. 60/713,935, filed on Sep. 2, 2005.

(51) Int. Cl.
*G06F 11/277* (2006.01)
(52) U.S. Cl. ...................................... 714/736
(58) Field of Classification Search .................. 714/736
See application file for complete search history.

(56) References Cited

U.S. PATENT DOCUMENTS

| | | | | |
|---|---|---|---|---|
| 5,843,676 A * | 12/1998 | Delespesse | ............. | 435/7.1 |
| 7,305,671 B2 * | 12/2007 | Davidov et al. | ............. | 717/172 |
| 7,433,804 B2 * | 10/2008 | Smith et al. | ............. | 702/186 |
| 7,630,708 B2 * | 12/2009 | So et al. | ............. | 455/425 |
| 2001/0052091 A1 * | 12/2001 | Goldsack et al. | ............. | 714/704 |
| 2002/0072359 A1 * | 6/2002 | Moles et al. | ............. | 455/425 |
| 2006/0256725 A1 * | 11/2006 | Engel | ............. | 370/241 |
| 2007/0117560 A1 * | 5/2007 | Pora et al. | ............. | 455/423 |
| 2007/0118899 A1 * | 5/2007 | Sridhar et al. | ............. | 726/22 |
| 2007/0207798 A1 * | 9/2007 | Talozi et al. | ............. | 455/423 |

* cited by examiner

*Primary Examiner* — Stephen M Baker
(74) *Attorney, Agent, or Firm* — Martine Penilla & Gencarella, LLP (57) ABSTRACT

A method for testing functionality on a JAVA enabled device is provided. The method includes downloading a test to the JAVA enabled device from a management unit having access to the test. The management unit is connected with a partner device polling the management unit. A message is forwarded from the JAVA enabled device to the partner device through the management unit. The expected content of the message is forwarded from the JAVA enabled device to the partner device, through the management unit. The message is then compared to the expected content. A system and a graphical user interface are also included.

20 Claims, 9 Drawing Sheets

DISTRIBUTED MIDLET TESTING

CROSS REFERENCES TO RELATED APPLICATIONS

This application claims benefit under 35 U.S.C. §119(e) of U.S. Provisional Patent Application Ser. No. 60/713,935 filed Sep. 2, 2005 and entitled "DISTRIBUTED MIDLET TESTING," which is herein incorporated by reference in its entirety for all purposes.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates generally to mobile devices, and more particularly, to systems and methods for MIDlet testing. As is generally known, a MIDlet is an application conforming to the Mobile Information Device Profile (MIDP) standard.

Today, embedded mobile devices are being used by consumers all around the world leading to an ever-increasing demand for providing additional services. Prior to providing those services it is necessary to test whether the services will function. In distributed testing of mobile devices, besides the testing device, a complex server side is generally required. Unfortunately, it is often times very difficult to understand and create the complex server side for testing purposes. For example, with regard to a Short Message Service (SMS) available for cellular telephones a server must somehow be connected to a device that will be operated by that server, where the server sends the SMS message through the network. This requires that one would need to have/write a driver to the device that is attached to the server. Additionally, if the server is installed into the cellular provider's network, the server must be synchronized with the cellular provider's network.

In view of the foregoing, a need therefore exists for a method and system capable of intelligent distributed testing on devices.

SUMMARY

Broadly speaking, the present invention fills this need by providing a method and a system for distributed testing on J2ME devices. It should be appreciated that the present invention can be implemented in numerous ways, including as a method, a system, or a graphical user interface. Several inventive embodiments of the present invention are described below In one embodiment, a method for testing a mobile device is provided. The method initiates with communicating a type of test to a management unit. The type of test is transmitted from the management unit to a partner device in response to polling the management unit by the partner device. The partner device is configured in accordance with the type of test. Data is communicated between the partner device and the mobile device as defined by the type of test. Expected data is communicated between the partner device and the mobile device via a management unit as defined by the type of test. The data and the expected data are compared to determine success of the test.

In another embodiment, a method for testing functionality on a JAVA enabled device is provided. The method includes downloading a test to the JAVA enabled device from a management unit having access to the test. The management unit is connected with a partner device polling the management unit. A message is forwarded from the JAVA enabled device to the partner device through the management unit. The expected content of the message is forwarded from the JAVA enabled device to the partner device, through the management unit. The message is then compared to the expected content.

In yet another embodiment, a system for distributed testing is provided. The system includes a first device and a second device configured to communicate with the first device. A testing tool having access to tests to be executed between the first device and the second device in order to ascertain whether the first device and the second device can communicate through a communication protocol associated with the tests is included. A management unit providing a hyper text transport protocol (HTTP) communication channel between the first device and the second device is provided. The management unit provides a first uniform resource locator (URL) address for downloading a test and a second URL for communicating results of the test.

In still yet another embodiment, a graphical user interface (GUI) associated with distributed testing performed between portable electronic devices is provided. The GUI includes a first region providing a test tree having a plurality of tests defining test functionality to be executed with the portable electronic devices. A second region configured to illustrate test details associated with one of the plurality of tests selected from the first region is included. A third region having control functionality for launching a test engine enabling a first one of the portable electronic devices to connect to a management unit that manages the distributed testing is provided.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Inventions for testing over a distributed network of small devices are provided. Several exemplary embodiments of the invention will now be described in detail with reference to the accompanying drawings.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The embodiments of the present invention provide methods and apparatuses for testing JAVA™ applications without the use of large, complex, powerful, and expensive servers. In one example, the JAVA™ applications (MIDlets) utilized herein are specially designed for mobile devices. Of course, the device-device communication interface can take on many forms, and can be any suitable type of product as long as the functions described herein can be executed thereon. It should be appreciated that Distributed tests are tests that involve two devices during the test execution. These kind of tests require 2 devices in order to test the desired functionality. For example, in order to test small message system (SMS) functionality, one unit sends the SMS message, and the second unit receives the SMS message. In order to send/receive an SMS message, there has been an SMSC (SMS Center), which understands all the devices in the network, and can deliver an SMS message between devices.

The embodiments described herein utilize two devices to perform the testing. However, more than two devices may be used to perform the testing, while remaining within the scope and purpose of the invention. Both of the devices should be able to send/receive SMS messages, or some other suitable messages over a protocol, and the embodiments may use the SMSC of the local cellular network for testing the sending and receiving of SMS functionalities. It should be appreciated that this is true not just for SMS functionalities, e.g., the distributed testing system may test Bluetooth or other functionalities. If the device under test supports Bluetooth capabilities, in order to test the device, there should be at least another Bluetooth device for the unit under test (UUT) to try and communicate with it.

Certain types of device testing require interaction between several J2ME™ devices. In one embodiment of the present invention, a joint distributed testing architecture may be utilized. Each test case involves some actions performed on several devices simultaneously. During this period some data is being collected, and at the end of the run, the data is analyzed and the decision is made about overall test status. In one embodiment, the present invention may be utilized to verify that the basic functionality of JAVA™ implementation within a mobile device is acceptable.

In one embodiment, the architecture enables network tests that need more than one device. For example, when testing SMS, the architecture provides the ability to accept real SMS messages through the network. In order to accomplish this, a partner MIDlet may be installed on a partner device. Once the test is started, the UUT is synchronized through the JDTS framework with the partner MIDlet device (partner device). The partner MIDlet device then sends the requested SMS message to determine if the SMS message is properly received by the UUT.

Figure 1:
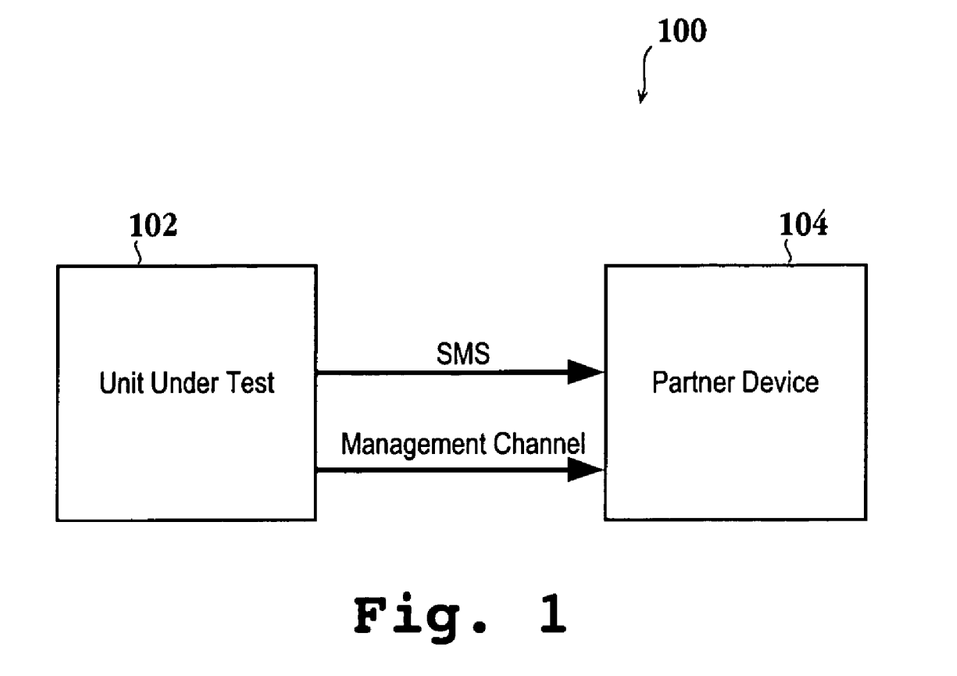
FIG. 1 shows a simplified joint distributed testing architecture in accordance with one embodiment of the present invention.

FIG. 1 shows a simplified joint distributed testing architecture 100 in accordance with one embodiment of the present invention. In one embodiment, testing of certain functionalities of a mobile device using a JAVA™ implementation may be conducted. For example, communication capabilities of a mobile device, such as SMS messaging capability may be tested. In such an embodiment, two or more mobile devices may be in communication with each other through a network to conduct device testing. In one exemplary embodiment, the architecture includes a UUT 102. The UUT 102 that is to be tested communicates with a partner device (PD) 104 for testing functionality of the UUT 102. In one embodiment, any suitable communication between two devices can be tested in order to verify the devices are capable of communicating via the communication protocol. Exemplary communication protocols include SMS, mail management system (MMS), Bluetooth, etc. Accordingly, the UUT 102 may be configured to communicate with the PD 104 through a communication protocol such as, for example, SMS, Bluetooth, MMS, to test the configuration of the UUT 102.

The PD 104 is configured to receive the communication from the UUT 102 and verify the content of the communication. In this way, the UUT 102 can be tested with another mobile-type device. In one embodiment, the PD 104 is configured to verify that the SMS message was received, translate an SMS message and to verify the accuracy of the SMS message. The PD 104 may include a partner device application that includes all of the activities the partner device can accomplish.

In one embodiment, a management channel, which may for example, be an HTTP channel, is utilized to communicate the expected results from the UUT 102 to the PD 104. Therefore, when the PD 104 receives the SMS message, the PD 104 requests through the management channel what the expected result is. The PD 104 compares the received SMS message with the expected SMS message from the management channel. If the received SMS message is the same as the expected SMS message, then the PD 104 sends a signal to the UUT 102 that verifies that the SMS has been received correctly. In one embodiment, the management channel must be verified as operating correctly, and if there is a problem in the test channel, then the source of the problem is traced. On the management channel, a management unit may be utilized such as described in FIG. 2.

Figure 2:
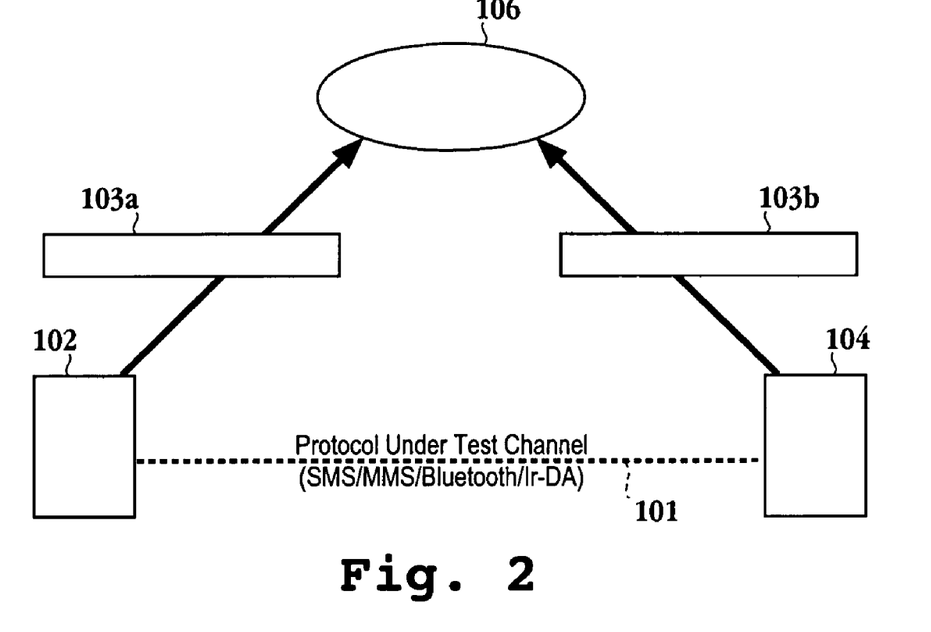
FIG. 2 illustrates a more detailed distributed testing architecture in accordance with one embodiment of the present invention.

FIG. 2 illustrates a more detailed distributed testing architecture in accordance with one embodiment of the present invention. The architecture includes UUT 102, PD 104, which also may be referred to as an Emulation Unit (EU) and management unit 106. In one embodiment, UUT 102 is a mobile device configured to communicate with other devices over a network. UUT 102 may be any suitable device that is capable of communicating over a network such as, for example, mobile telephones, personal digital assistants (PDA's), portable computers, etc. In one embodiment, in case of a network test, i.e., a test that sends or receives messages through the network, UUT 102 may run the main part of the test and obtain help from partner device 104.

The partner device 104 may also be any suitable mobile device configured to communicate with other devices over a network such as, for example, mobile telephones, personal digital assistants (PDA's), portable computers, etc. The partner device 104 may include memory that can store software to be run that can interact with the UUT 102. In one embodiment, the software on the partner device 104 may be a JAVA MIDlet configured to communicate with the UUT 102 both through a direct communication channel 101 and through management unit 106 via one or more of management channels 103a and 103b. In another embodiment, the partner device 104 runs test code complimentary to the UUT 102.

The management unit 106 may be any suitable type of computing device that can facilitate the management channel communication between the UUT 102 and the partner device 104 via management channels 103a and 103b. In one embodiment, the management unit 106 may be a hyper text transport protocol (HTTP) server, which manages all of the communication between the UUT 102 and the partner device 104. For example, if the UUT 102 sends the message to the partner device 104, the UUT 102 may send a message through the management unit 106 via management channels 103a and 103b. The application running on the partner device 104 continually polls the management unit 106. If the UUT 102 needs to send the SMS message then the partner device 104 needs to receive the message. Alternatively, if the UUT 102 needs to receive the SMS message, then the partner device 104 sends the SMS message. Thus, the partner MIDlet on the partner device 104 behaves according to the test being run on the UUT 102 as described in more detail below. In one embodiment, the partner device 104 may be thought of as stateless, i.e., the partner device 104 does whatever is required of it by the test being run on the UUT 102. It should be appreciated that any suitable protocol other than HTTP may be utilized for management unit communication. Once the testing has been completed, the partner device 104 may communicate the testing results over the management channel to the UUT 102 via the management unit 106.

In one exemplary embodiment, during a communication test, the UUT 102 may communicate to the management unit 106 that a test is to be run. Contemporaneously, the partner device 104 is polling the management unit 106 to determine if a test is to be run. Therefore, the management unit 106 can communicate with the partner device 104 and communicate that the UUT 102 will send a message to the partner device 104. The management unit 106 can also notify the UUT 102 that the partner device 104 is ready to receive the communication. The DistributedTestService API is a framework under which a test is run. The DistributedTestService API may be an auxiliary class that provides logging, synchronization and data exchange services for running activities such as, for example, testing. A method for obtaining the next activity scheduled for execution on the partner device 104 is one of the functions provided by the DistributedTestService API. It should be appreciated that the DistributedTestService API may have slight differences between implementations on the UUT 102 and the partner device 104.

In one embodiment, the partner device 104 includes a partner device application such as a MIDlet, which includes all of the activities the partner device can use to complement the testing desired by the UUT 102. The partner device application and a testing application within the UUT 102 include activities. The activities contained in the testing application of the UUT 102 include those that are complementary to the activities of the partner device application. In one embodiment, the testing application may also be a testing MIDlet. Therefore, in one exemplary embodiment, when the activity of sending a SMS message is activated by the testing application within the UUT 102, then the activity of receiving a SMS message may be activated by the partner application, and vice versa. It should be appreciated that an activity may be a sequence of actions performed on the UUT 102, which is described in a way which is generic enough so it is possible to run those actions both on the UUT 102 and the partner device 104. In one embodiment, a test that may be run is a JAVA file, which implements an AutomatedTest interface, and is suitable for running on the UUT 102 in context of a TestBeans Agent. The code that should be called in all distributed tests is put into class DistributedTest and can be conveniently used by test authors by extending it.

In order for the two devices to communicate properly, they need to have a management channel besides the test protocol channel. The device that tests the functionality the user wishes to verify is referred as UUT device, and the device that should support the UUT is referred as the Partner Device. FIG. 2, as discussed above, displays the distributed tests system architecture. The UUT 102 and the PD 104 exchange information through the management channel 103a and 103b, and use the "Protocol Under Test Channel" 101 to test the functionality. Continuing the SMS example, when sending SMS functionality about to be tested, the UUT 102 needs to send a SMS message to the PD 104 on the "Protocol Under Test Channel," 101 which is the SMS channel in this case. The PD 104 needs to activate the "Receive SMS" functionality. In order for the PD 104 to know if the SMS received by the PD 104 was the correct one, the UUT 102 and the PD 104 communicate through the Management Channel 103a and 103b. In this SMS example the test execution will be performed as follows:

A user connects the PD 104 to the Management Unit 106. This communication is done over HTTP protocol (a mandatory protocol on the JAVA for mobile stack according to the specification in one embodiment). PD's application waits for instructions (doing polling every one second, or some other suitable period of time, asking the Management Unit 106 if there are tasks the PD 104 should do). The user selects to test the "Send SMS" functionality test and downloads the test to the UUT 102. The UUT 102 connects to the Management Unit 106, and sends a notification to the PD 104 through the Management Unit 106 that the UUT 102 is about to send an SMS. As a consequence, the PD 104 will load the "Receive SMS" functionality and will wait for the SMS to arrive. The UUT 102 will also notify the PD 104, through the Management Unit, what the expected SMS content is (e.g., the UUT 102 sends "HELLO"). The UUT 102 sends "HELLO" through the SMS channel (the Protocol Under Test Channel) and the PD 104 receives the SMS message. Then, the PD 104 compares the content of the received SMS with the expected one. If the result is the expected one, the PD 104 sends via the Management Unit an OK message, otherwise the PD 104 sends a FAIL message to the UUT 102. The UUT 102 reports the result to the JDTS test console.

Figure 3A:
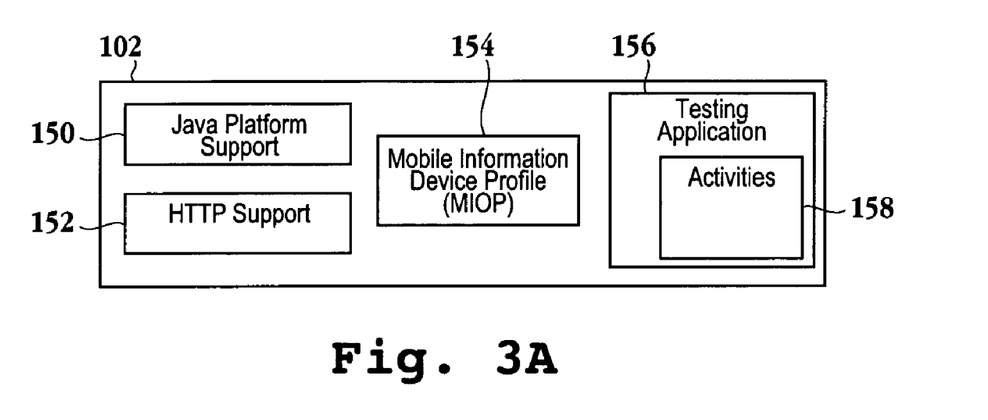
FIG. 3A shows the unit under test in accordance with one embodiment of the present invention.

FIG. 3A further illustrates the UUT in accordance with one embodiment of the present invention. In one embodiment, the UUT 102 includes a JAVA platform support 150, an HTTP support 152, a mobile information device profile (MIDP), and a testing application 156. In one embodiment, the JAVA platform support 150 enables the UUT 102 to run JAVA software under a particular JAVA specification. If an SMS message is sent through JAVA software, verification is needed that the UUT and the PD support such a test. For example, a JAVA specification request (JSR) describes a functionality/protocol that is desired to be implemented in a device and the JSR is verified by the UUT 102 and the partner device 104. The HTTP support 152, in one embodiment, enables the UUT 102 to communicate with the management unit 106 through an HTTP channel. The mobile information device profile (MIDP) 154 is a type of JAVA software that may be utilized for mobile platforms. The testing application 156 may be the software that is utilized to run the test. In one embodiment, the testing application 156 may include any suitable number of activities that can used to run certain tests. An exemplary SMS activity is listed in Table 6. It will be apparent to one skilled in the art that while specific examples of a SMS activity is provided the embodiments described herein may be extended to other communication protocols.

An Activity, as used herein is a unit of functionality. For example, an Activity may be "Send SMS Activity" or "Receive SMS Activity." The way that the distributed tests were designed is to be symmetric tests or complementary tests. That is, in one case the UUT may run the "Send SMS Activity" test and the PD will run the "Receive SMS Activity." In another case, it might be that the UUT will run the "Receive SMS Activity" to test the receiving SMS functionality, while the PD will run the "Send SMS Activity." It should be appreciated that the "Activities" may run on the UUT or on the PD without any special configuration or preparation. The only precondition is that the devices are needed to support the functionality that the Activity is about to use. For example, using SMS functionality in case of an SMS Activity, or Bluetooth functionality in case of a Bluetooth Activity. A "Send SMS" test will first send a request with the corresponding details of which Activity to load. After the Activity was loaded by the PD, the PD will send a notification to the UUT that the Activity was loaded and that it may proceed with the tests execution. From this moment both of the Activities, on the UUT side and on the PD side, continue with the execution until the result of the test is produced. During the Activities execution, the PD and UUT continue to communicate through the Management Unit. As was mentioned above, the UUT sends a request to the PD, through the Management Unit to load a certain "Activity." Actually, the PD has all the required "Activity" classes, and according to the instructions it gets from the UUT, the PD will load an "Activity" and will start it to support the test executed on the UUT.

Figure 3B:
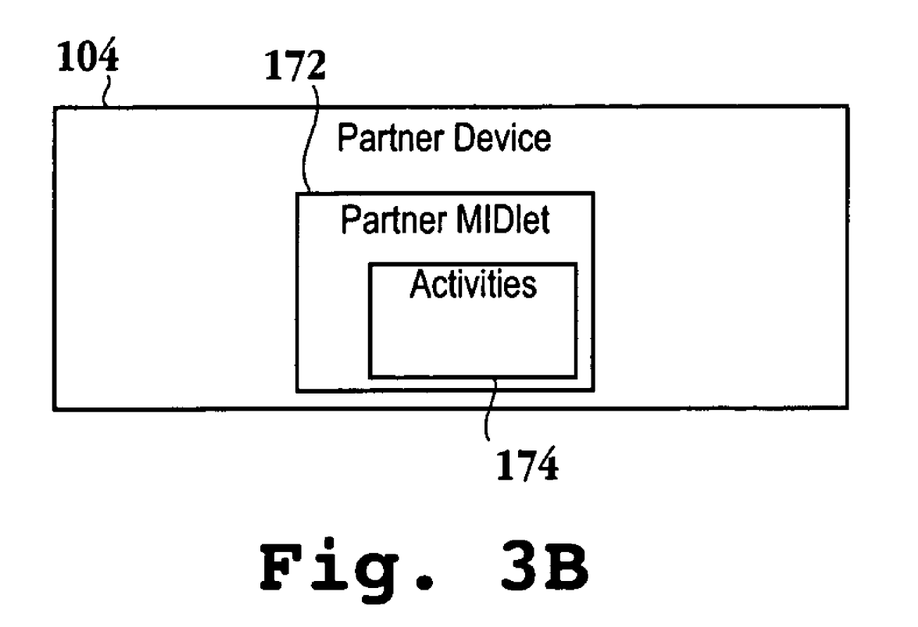
FIG. 3B illustrates the partner device in accordance with one embodiment of the present invention.

FIG. 3B illustrates the partner device 104 in accordance with one embodiment of the present invention. In one embodiment, the partner device 104 includes a partner MIDlet 172 capable of responding to the UUT and the test desired to be run. Of course, the partner MIDlet 172 may be stored in memory of the partner device 104. In one exemplary embodiment, the ability to send and/or receive SMS messages is tested. Therefore, depending on whether the UUT is tested for sending or receiving SMS messages, the partner MIDlet 172 is configured to respond accordingly. When SMS sending is tested, the partner MIDlet 172 operates to enable the partner device to receive the SMS message from the UUT. In another embodiment, when SMS receiving is tested, the partner MIDlet operates to enable the partner device to send the SMS message to the UUT.

Figure 4:
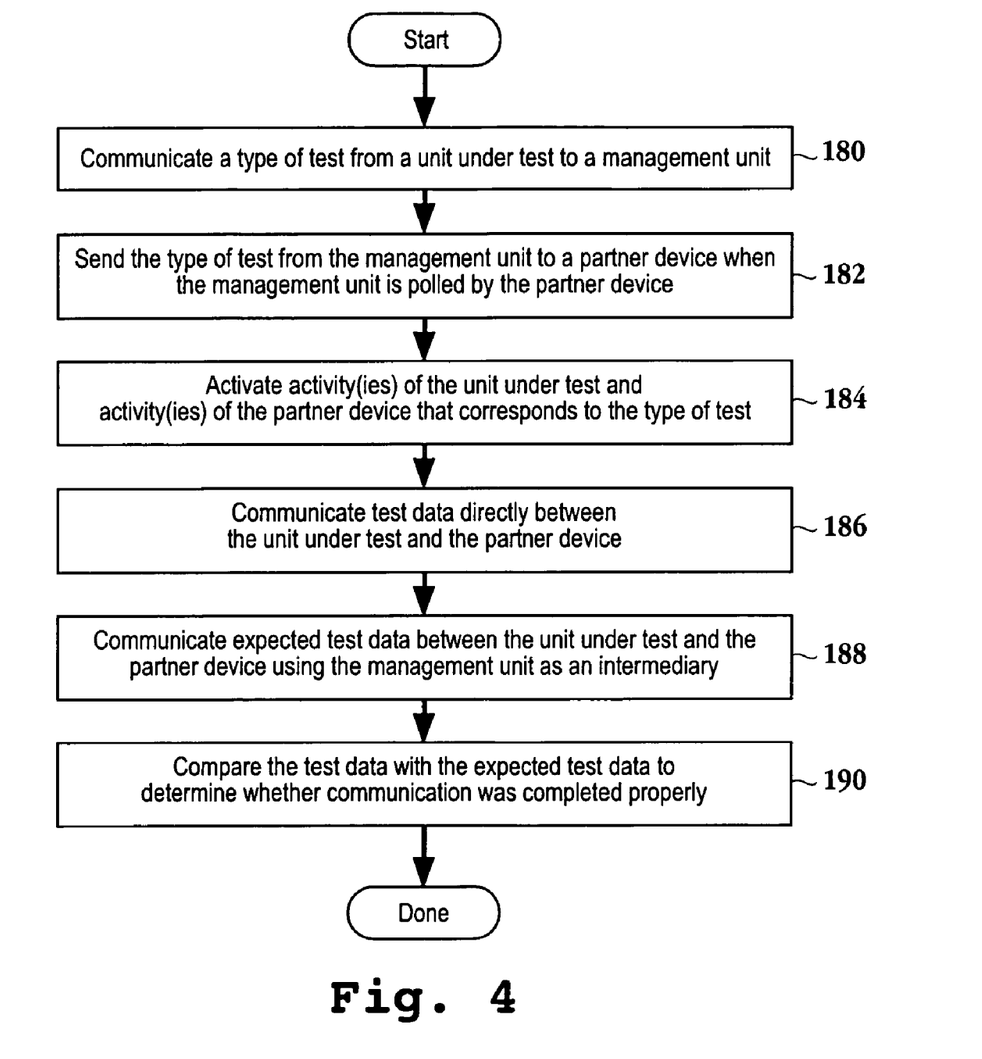
FIG. 4 illustrates a flowchart defining a method for distributed testing in accordance with one embodiment of the present invention.

FIG. 4 illustrates a flowchart defining a method for distributed testing in accordance with one embodiment of the present invention. Operation 180 communicates a type of test from a UUT to a management unit. As described above, the UUT and the partner device may be any suitable mobile device that includes JAVA software enabled capabilities. It should also be appreciated that the type of test may be any suitable test that can be run between two mobile devices. In one embodiment, communication capabilities of the UUT may be tested and these communication capabilities may be associated with standards including SMS, MMS, Bluetooth, etc. Therefore, to start the test, the UUT communicates with the management unit that a certain type of test is to be run. After operation 180, the method proceeds to operation 182 where the type of test is sent from the management unit to a partner device when the management unit is polled by the partner device. The partner device is configured to poll the management unit to determine if the UUT desires a test to be run. In response to being polled by the partner device, the management unit sends the data regarding the type of test to be run by the UUT to the partner device.

Activity(ies) of the UUT and activity(ies) of the partner device that corresponds to the type of test are activated in operation 184. In one embodiment, the UUT and the partner device both include at least one activity. The activities on the UUT and the partner device may be complementary. That is, for example, in a communication test, the UUT may have a send data activity and the partner device may have a receive data activity, or vice versa.

After operation 184, the method moves to operation 186 in which test data is communicated directly between the UUT and the partner device. In one embodiment, in a communication test, the UUT may send data such as, for example, an SMS message, to the partner device and the partner device may receive the SMS message. In another embodiment, the partner device may send data such as, for example, an SMS message to the UUT and the UUT may receive the SMS message. It should be appreciated that the type of test depends on the type of test desired by the UUT.

After operation 186, the method moves to operation 188, which communicates expected test data between the UUT and the partner device using the management unit as an intermediary. In one embodiment, during a send data test, the UUT sends the expected test data to the management unit. The expected test data is identical to the test data sent to the partner device. The management unit forwards the expected test data to the partner device. In operation 190 the test data is compared with the expected test data to determine whether communication was properly completed. If the test data and the expected test data match, then the test is a success and if the test data and the expected test data does not match then the test is not a success. The partner device may then send a message to the management unit specifying the test result. The result is then forwarded by the management unit to the UUT.

Figure 5:
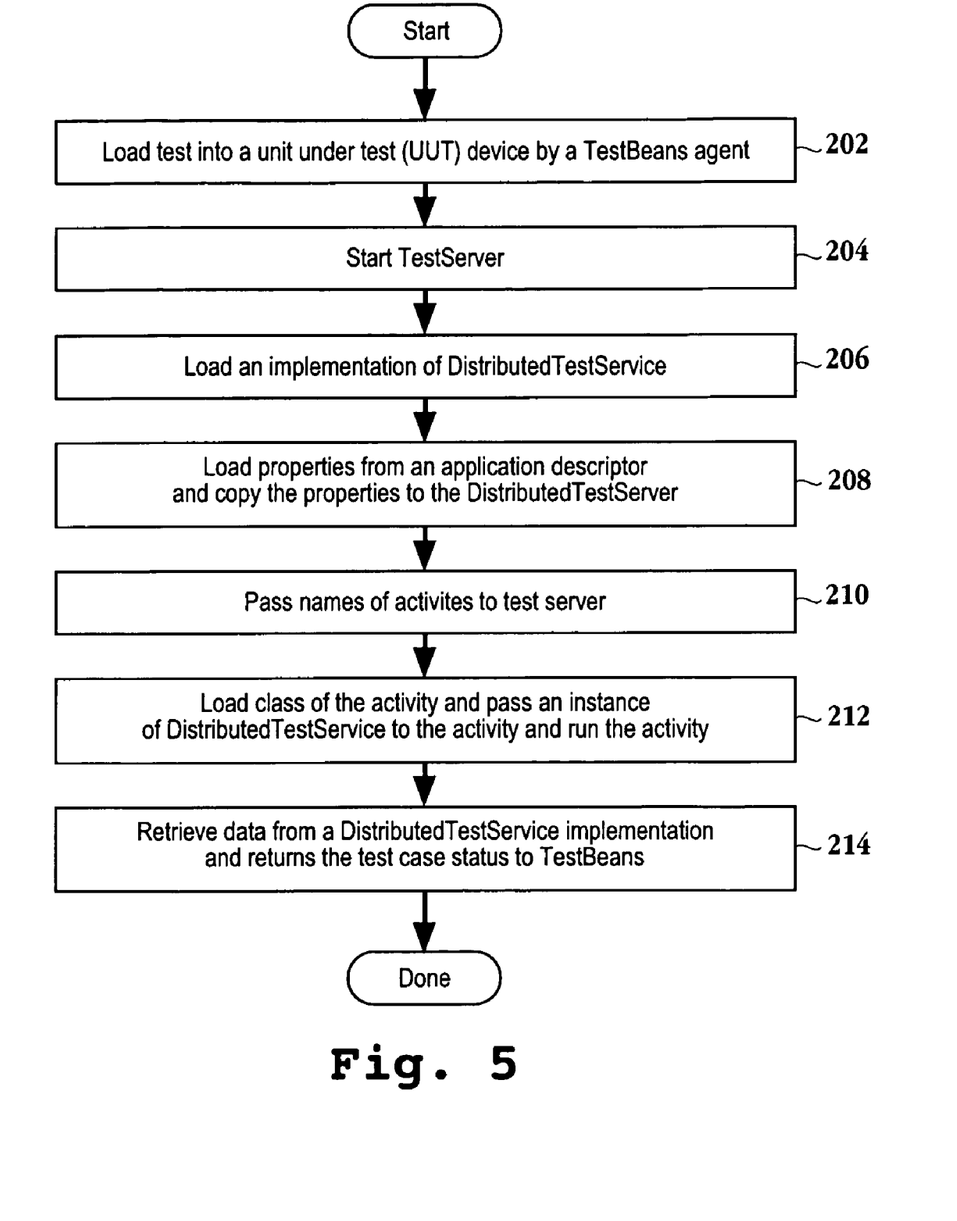
FIG. 5 shows a flowchart defining a method for a specific exemplary implementation of distributed testing on the unit under test in accordance with one embodiment of the present invention.

FIG. 5 shows a flowchart defining a method for a specific exemplary implementation of distributed testing on the UUT in accordance with one embodiment of the present invention. The method begins with operation 202, which loads a test into a UUT device by a TestBeans agent. Operation 204 starts the TestServer. Operation 204 is conducted if the TestServer has not yet been started. In one embodiment, the TestServer is started by using a standard TSM API: lanchTestServer( ) The test server flushes its store to clean state when it detects the launchTestServer( ) call.

After operation 204, the method proceeds to operation 206, which loads an implementation of DistributedTestService. In one embodiment, the URL of the management unit, or other information about the management channel, is passed to DistributedTestServer. Then the method moves to operation 208 which loads properties from an application descriptor and copies the properties to the DistributedTestServer. In one embodiment, Runner.getProperty( ) may be used to load properties from the application descriptor and copy them to the DistributedTestServer. In this manner, all activities, both local and remote can read the parameters specified in a card file.

Operation 210 passes names of activities to the TestServer. In one embodiment, the test may call the put( )method of DistributedTestService to pass the names of the required activities to the test server. The put( ) method is described in further detail below. The activity names are taken from the card file. One skilled in the art will appreciate that the card file is a TestClass description file, which includes information such as the names of the test cases. In one embodiment, the JDTS framework uses the card file information to build the test tree, and for runtime test execution process, such as passing the test the properties it needs. On the partner device, the instance of the DistributedTestService provides a method for retrieving this information from the TestServer: getActivity( ). After operation 210, the method proceeds to operation 212, which loads a class of the activity and passes an instance of the DistributedTestService to the activity and runs the activity. Then operation 212 retrieves data from the DistributedTestService implementation and returns the test case status to TestBeans agent.

Figure 6:
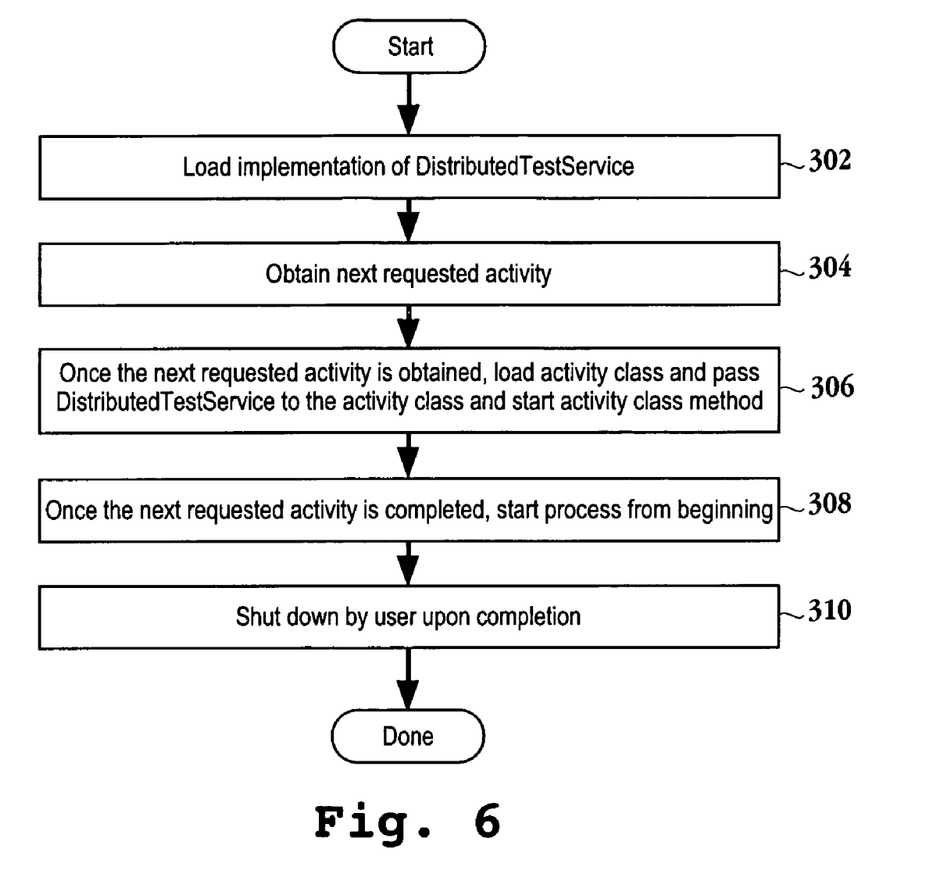
FIG. 6 illustrates a flowchart defining an method for an exemplary specific implementation of a distributed testing as processed in the partner device in accordance with one embodiment of the present invention.

FIG. 6 illustrates a flowchart defining a method for an exemplary specific implementation of a distributed testing as processed in the partner device in accordance with one embodiment of the present invention. The method begins with operation 302, which loads an implementation of DistributedTestService. Then in operation 304, the method obtains a next requested activity. After operation 304, the method advances to operation 306 where once the next requested activity is obtained, an activity class is loaded and the DistributedTestService is passed to the activity class and the activity class method is started. Then, in operation 308, once the next requested activity is completed, the process is started from the beginning. After operation 308, the method moves to operation 310 where a partner device MIDlet is shut down by a user upon completion.

Figure 7:
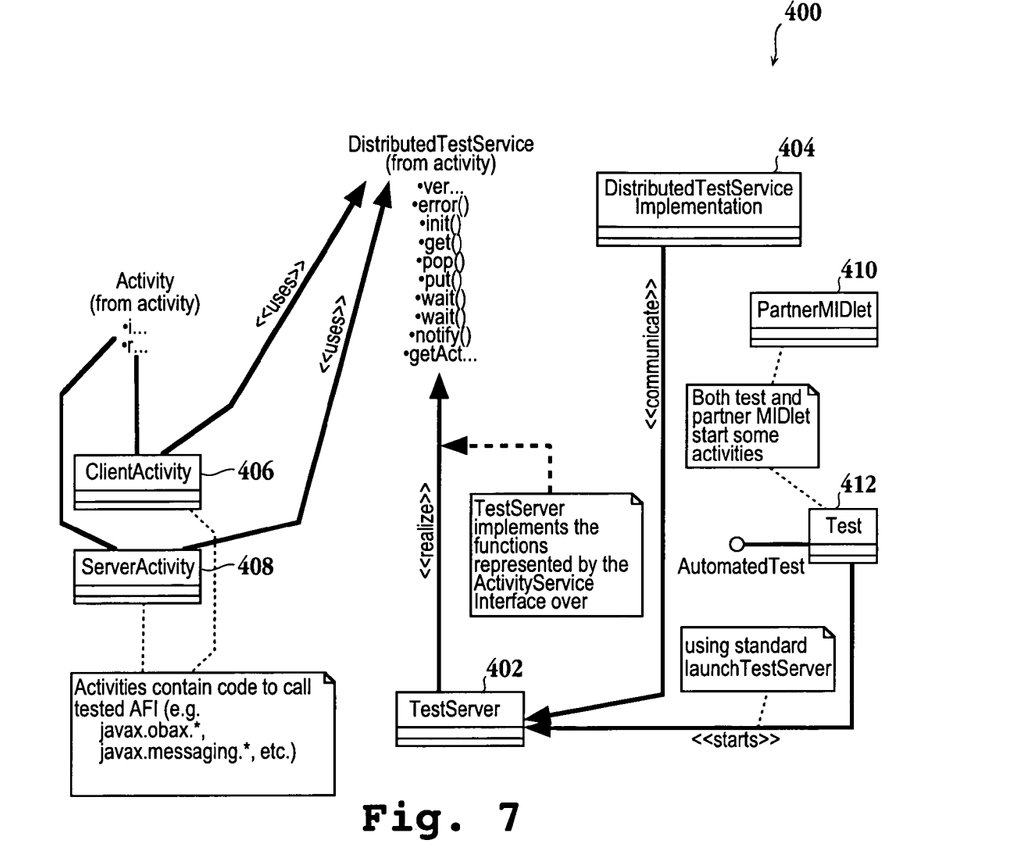
FIG. 7 shows a class diagram of the distributed test system in accordance with one embodiment of the present invention.

FIG. 7 shows a class diagram of the distributed test system in accordance with one embodiment of the present invention. The diagram illustrates the relationships between the software utilized to run the distributed testing. As described with reference to FIG. 5, TestServer 402 is launched and an implementation of DistributedTestService 404 is loaded. The test proceeds as discussed with reference to FIG. 5 on the UUT side through client activity 406 and server activity 408. On the partner device side, as explained with regard to FIG. 6, the partner device loads the DistributedTestService 404. Partner MIDlet 408 performs the functionality described above to execute Test 410 and proceeds accordingly. It should be appreciated that the tests performed on the UUT and the PD sides are complimentary. That is, if the UUT downloads a send test, the PD will download a receive test.

Figure 8:
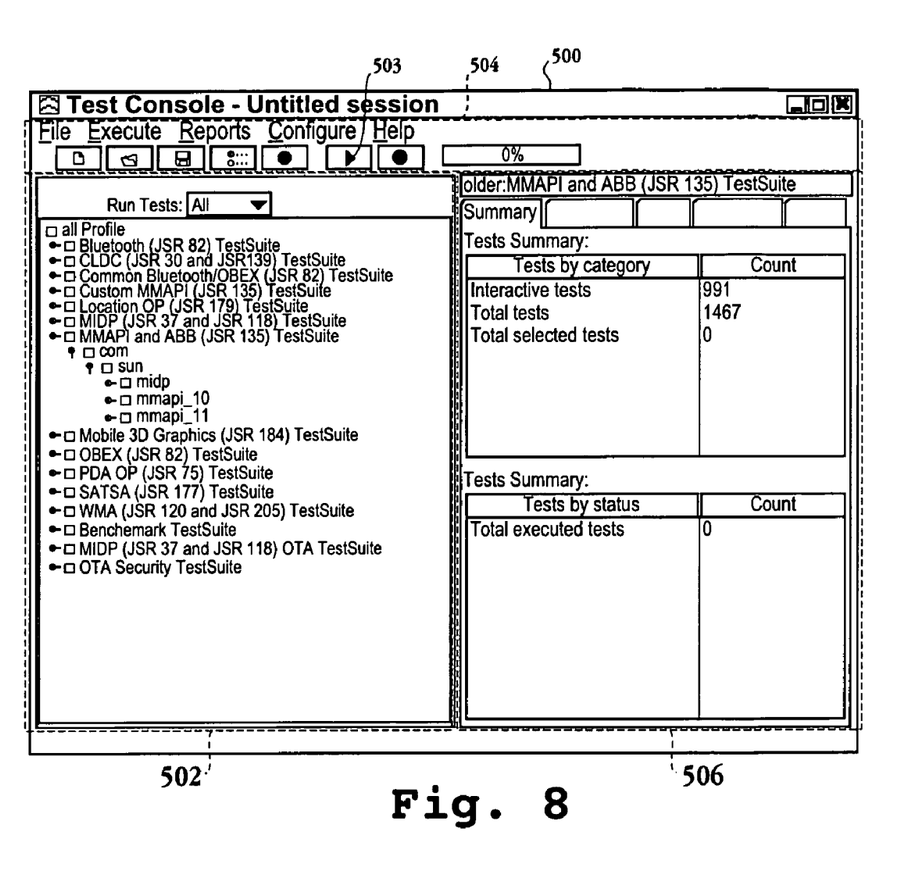
FIG. 8 is a simplified schematic diagram illustrating a graphical user interface (GUI) associated with a test console and displaying a test tree in accordance with one embodiment of the invention.

FIG. 8 is a simplified schematic diagram illustrating a graphical user interface (GUI) associated with a test console and displaying a test tree in accordance with one embodiment of the invention. GUI 500 includes regions 502, 504, and 506. Region 502 includes a test tree illustrating exemplary tests that may be performed in a distributed testing system as described herein. A user may select a test from the test tree in region 502, e.g., WMA (JSR120 and JSR205) Test suite, which is an exemplary SMS test. It should be appreciated that GUI 500 may be displayed on a display screen associated with a general purpose computer. It should be further appreciated that the JAVA Device Test Suite (JDTS) accessed through GUI 500 is a testing tool for testing JAVA stack implementation (J2ME stack) on mobile devices such as mobile phones and PDAs. In JDTS there can be more than 10,000 tests, which test the device functionalities such as gaming, communication protocols, multimedia and more. In one embodiment, to select which tests to run, JDTS contain a "Test console" (TC) tool, which supplies GUI 500 with test for selection through the test tree of region 502. After selecting the tests, the user connects the UUT to the JDTS console (which functions also as a server), to download the tests to the UUT.

Region 506 of GUI 500 includes test details of a particular test being executed between the UUT and the PD. Region 504 illustrates buttons providing control functionality for executing a selected test of the test tree. For example, button 503, when activated, initiates an engine that will load the UUT and PD with the appropriate complementary tests via a URL address associated with the test console. Once the test are downloaded, the PD connects with the UUT through a management channel different than the channel for downloading the tests, e.g., a different URL address. The tests are conducted through the management channel to determine if the UUT supports the desired functionality.

In one embodiment, two types of exceptions may be utilized. Common channel errors occur when the transport layer of the management channel between the DistributedTestService implementation and TestServer is lost. Another type of exception is premature activity termination, when activity on EU or on UUT is terminated by the TestServer, when the test result is known for sure. For example, if the sending activity of the communication test failed, there is no need to run receiving activity on the counterpart device. Another example is the termination of the performance or stress test when the specified time interval has passed.

Both exceptions are represented by DistributedTestException, and are distinguished by the message, which is set to one of the predefined values. Activities may want to intercept this exception, if some cleaning up is needed for proceeding testing correctly, e.g. unregistering services on the server side.

Depending on the test suites where the test is run, different types of configurations may be possible. For example, for common and private components for WMA and Bluetooth test suites, the implementation of the MIDlet in the partner device, implementation of DistributedTestService, and TestServer may, in one embodiment, be shared between the test suites. The code common to all distributed tests may be placed into the DistributedTest class which can be used by extending it. The activity implementation in such a case can be written by test authors based on their test scenarios. Activity implementation can be reused in several test cases.

The following describes an exemplary method to generate the test using the architecture described above. In one embodiment, the test scenario may be divided into parts, which should be executed on the UUT and partner device. This division may be dictated by the test scenario. Then a new activity may be created, that is, a JAVA file under src/activities, so that activity class implements Activity interface. Then the partner device part of the code may be put to the run( )method of the activity. The build process of the partner device MIDlet may include all activities in the .jar file. If the total size of all activities would exceed device constraints, then it may be necessary to build several packages with the same partner device MIDlet and different sets of activity classes.

The UUT part of the test may then be divided into two parts:

a) a part which exercises API under test and put it to the separate activity in the same way as the partner device part of test scenario.

b) a part which only retrieves data from the DistributedTestService and decides overall test status.

The division as described above may be varied depending on the test conditions or test configuration desired. For example, actions like comparison of request result with some expected value may be a better fit to the test case code.

In this way, two activities are obtained (one for UUT and one for PD), as well as some piece of code in the test case method. To bind the parts together, activity class names are input into the card file, so that appropriate calls in the test code would pick them up and start as needed. To simplify this task, a convenience base class DistributedTest may be introduced, so that the code for handling properties and activities need not be duplicated in each test. The methods of DistributedTest are called instead. Then the activity class names can be put to the card file of the test. The activity class names may be listed in the 'requires' clause of the card file, so that the activity classes would be available when test is run.

In one embodiment, methods of the AutomatedTest interface may be implemented according to the distributed test sample. Examples of JAVA code include Activity.java, DistributedTestService.java. More JAVA code is provided in the BLUETOOTH workspace (jsr082). There is an example of base class for the test, which defines the procedures for selecting, loading and starting the next requested activity. The list of the infrastructure class files may include those shown in Table 1.

TABLE 1 com.sun.midp.distributed
    Activity
    DistributedTestService
    DistributedTestException
com.sun.midp.distributed.http.partner
    PartnerMIDlet
    DistributedTestServiceImpl
com.sun.midp.distributed.http.uut
    DistributedTest
    DistributedTestServiceImpl Tests and activities may be placed in packages such as shown in Table 2.

TABLE 2 com.sun.midp.jsr082.obex.functional
com.sun.midp.jsr082.obex.functional.activities
com.sun.wma2_0.functional
com.sun.wma20.functional.activities An exemplary DistributedTestService representation, in one embodiment, over HTTP/1.0 is described below. The protocol of access to distributed test service over HTTP is a specification of some query parameters and their meaning. The TestServer, which implements the distributed test service, may be a servlet, listening on a certain URL for both GET and POST requests. For example, in the context of the TestBeans conventions, the URL may be: /test/service.

The request meaning may be determined by its query parameters, specified in the URL query part or in request body for GET and POST methods, respectively. The parameters can consist of name-value pairs, where the names may repeat multiple times. The server can analyze the request parameters, conduct requested actions and provide a response. The server may perform 'put', 'get' and 'pop' actions in substantially the same order as parameters that were passed in the request. The server may ignore unknown parameters. The possible query parameters may be wait, notify, get, put, and pop as shown in Table 3.

TABLE 3

| | |
|---|---|
| Wait | the name of the synchronization point, server shall report whether it was reached by one of the activities. If any of the requested synchronization points is not reached, then server should delay the response. Server must not delay the response after reaching all synchronization points. Server must not delay the response for more than 30 seconds. |
| Notify | the name of the synchronization point, server shall mark it as reached and report is as such for all further "wait" requests. No server response is required for this parameter. |
| Get | variable name, Server shall response with value of the variable (top value of the value stack). Server must respond immediately if "get" parameter is present in the request. |
| Put | variable name and value, separated by equal sign ("="), Server shall assign the value to variable (push value to the value stack) |
| Pop | variable name, Server shall respond with the value of the variable and remove it from the value stack. Server must respond immediately if "pop" parameter is present in the request. |

The server may respond with any suitable text/plain message such as, for example, shorthand response line, detailed response lines and may be interspersed with comments. In one embodiment, detailed response lines correspond to the request parameters as shown in Table 4.

TABLE 4

| | |
|---|---|
| get=AAA ---→ | AAA=value |
| pop=AAA ---→ | AAA=value |
| wait=WWW ---→ | WWW:reached |
| | WWW:not reached |

Other request parameters shall not produce any response lines. The strings are provided in the response in the order of processing. For ease of parsing the response in simple cases, the first line of the response may contain, if any "wait" parameter was present in the request, a string "reached" or "not reached," depending on whether all requested synchronizations were reached. If no "wait" parameter were present, but "get" or "pop" parameters were present, then the first line may contain the value of the first requested variable without any additional markup. Thus, in simples cases of one request, or pure wait request, which are likely to be produced by DistributedServiceAPI, the response parsing would be easy as getting the first line of server response. The remaining part of the server response can be used for detailed logging and for debugging purposes. Lines starting from the hash character ("#") are considered and must be ignored by the client. The server may put human readable explanations in the comment lines.

The DistributedTestService methods may be implemented as shown in Table 5.

TABLE 5

| | |
|---|---|
| Wait(String) | client shall send request with exactly one parameter Wait=<String value>; if the response is positive, then return, otherwise, start from the beginning. If the timeout interval was exceeded, implementation must throw DistributedTestException. |
| Wait(string[ ]) | client shall send request with all synchronization points listed as "wait" parameters; the request shall be repeated until timeout interval is exceeded or all synchronization points are reached. May be implement sequential calls of wait(String) |
| Notify(String) | client shall send request with exactly one parameter "notify". |

TABLE 5-continued

| | |
|---|---|
| Put (String, String) | client shall send request with exactly one parameter "put", which is combined from the two strings separated by equal sign ("="). |
| Get(String) | client shall send request with exactly one parameter "get". The result of the request will be returned. |
| Pop(String) | client shall send request with exactly one parameter "pop". The result of the request will be returned. |
| Verbose (String, int) | may be implemented as put with some predefined key (on the Partner Device), and as Runner. verbose call on the UUT device. |

Design decisions for the DistributedTestService implementation are described further below. In one embodiment, to keep TestServer simple and clear, logic may not be included in the TestServer. A simple web server working in a request-response model may be utilized as the TestServer in one embodiment. Each activity may have a unique runtime identifier of the test, which is being run at the moment. If that identifier changes, it means that new test is in progress, and the current activity should be stopped by throwing an exception. In one embodiment, the TestServer is configured to not keep track of tests running, so the identifier may be put under the "Test 10" key to the variable store of the TestServer. When new activity is started, the "Test 10" identifier may be requested and saved as a current test identifier. Each request to the test server may be accompanied by the get "Test 10" request, and the identifier may be matched against a saved one. This way, the putting logic to the test server may be avoided and the activity identifier may be passed to the test server. In addition, activities, e.g., HTTP sessions, may be tracked on the test server.

In one embodiment, the loop to get next requested activity can be put to this implementation, rather than to a partner midlet. The loop may appear from the fact that before the next requested activity is put to the test server, it would continuously return empty strings for the request, so the DistributedTestService would be requesting it in a loop with some delay between attempts. This process, however, may be interrupted at any time by the test operator by pressing "Exit" button on the partner device.

Test Server design decisions are described further below. In one embodiment, Test Server may be implemented as a Servlet. By doing this, it would be possible to run the test server in an ordinary servlet container and it would encourage TestBeans developers to re-factor their web server to the same servlet container and thereby eliminate some of the problems arising from use of separate test servers. This would not conflict with existing frameworks of the test servers.

Partner MIDlet design decisions are described below. In one embodiment, the partner MIDlet may be installed from the JAR and JAD served by the same test server. (If the test server would implement at least something of a servlet container, they can easily be served by different servlets). In one embodiment, the .jad file contains the key "DistributedTestServiceURL" with the URL pointing back to test server. It should be appreciated that the architecture described herein may be suitable for inclusion of TestBeans as a standard feature. In such an embodiment, the agent code may be slightly modified and the TestBeans web server may support more functionality such as storage and synchronization services and JAR and JAD service for the partner device MIDlet. One skilled in the art will appreciate that the JAD file describes the actual application. For example, the JAD file contains the URL to from where to download the JAR file. The JAR file contains the PM application itself, which contains the JAVA classes and the application resources, like the Activities classes.

Although specific reference is made to terminology defined by Sun Microsystems, Inc., it should be understood that any name could be used for such terms, so long as the desired functionality is achieved. For instance, reference is made to JAR and JAD files, but in a broad sense, these terms simply define computer code and data. The same applies to the underlying environment for the UUT. UUT can be any mobile device, and the device can run any operating system. The operating system can support any communication protocol, including protocols for downloading application files. Accordingly, any reference to a particular standard should be viewed only as exemplary and focus should be placed on the claimed functional operation.

Table 6 below provides an exemplary Activity class that tests functionality for sending a SMS message.

TABLE 6

```
SMS Activity.
/*
 * @(#)SMSClientSendActivity.java 1.12 05/06/11
 *
 * Copyright 2005 Sun Microsystems, Inc. All rights reserved.
 */
/*
 * ident "@(#)SendActivity.java 1.8 2004/01/27 SMI"
 */
package com.sun.wma.functionat activities;
import java.io.IOException;
import javax.microedition.io.Connector;
import javax.wireless.messaging.*;
import com.sun.midp.distributed.Activity;
import com.sun.midp.distributed.DistributedTestService;
import com.sun.midp.distributed.DistributedTestException;
public class SMSClientSendActivity implements Activity {
public void init(DistributedTestService service) {
private DistributedTestService service;
this.service = service;
}
private String address;
private int messageNumber;
private String appPort = MessageRepository.DEFAULT_PORT;
private int segNum = 1;
private String encoding;
public void getParameters( ) throws DistributedTestException {
service.verbose("Waiting for parameters to be set...",service.DEBUG);
//UUT is waiting for the PD to set the parameters for the "Receive SMS" //
Activity
service.wait("parameters set");
service.verbose("Parameters - Done",service.DEBUG);
//UUT is asking the PD the port for getting SMS
String p = service.get("SMS portNumber");
if (null != p) {
appPort = p;
}
//UUT is asking the PD the encoding used to encode/decode the SMS
encoding = service.get("SMS encoding");
try {
//UUT is asking the PD for its max number of segments it can receive
segNum = Integer.parseInt(service.get("Number of segments"));
} catch (NumberFormatException nfe) {
segNum = 0;
}
service.verbose("SMSClientSendActivity: encoding " + encoding
+ "segNum: " + segNum, service.VERBOSE);
//UUT is asking the PD for its address (phone number)
String to = service.get("to");
if (null == to) {
throw new DistributedTestException("no recipient specified");
}
//UUT builds the address of where tosend the SMS to
address = "sms://" + to + ":" + appPort;
service.verbose("SMSClientSendActivity: using sms client address "
+ address, service.VERBOSE);
}
//The method responsible of sending the SMS
public void send( ) throws DistributedTestException {
MessageConnection conn = null;
```

TABLE 6-continued

```
Message m = null;
try {
//UUT waits for the PD to notify that it is ready to receive SMS - this is
blocking method
service.wait("receiver ready");
//After PD has notified that it is ready
conn = (MessageConnection) Connector.open(address);
MessageRepository r = new MessageRepository( );
//Sending SMS
if (encoding.equals("gsm7")) {
service.verbose("SMSClient: gsm7!" + segNum, service.VERBOSE);
m = r. createTextMessage(conn, segNum, encoding);
service.verbose("!!SMSClientSendActivity: message to be sent: "
+ MessageRepository.toString(m), service.VERBOSE);
service.put("expected message", MessageRepository.toString(m));
} else if (encoding.equals("ucs2")) {
//UUT sends the expected result over the Management Channel to the PD
m = r.create TextMessage(conn, segNum, encoding),
service.put("expected message", MessageRepository.toString(m));
} else if (encoding.equals("binary")) {
m = r.createBinayMessage(conn, segNum);
service.put("expected message",
new String(MessageRepository.toByteArray(m)));
} else {
throw(new
DistributedTestException("Unknow message encoding or type: "
+ encoding));
}
// workaround, address should have been set automatically
// m.setAddress(address);
// service.verbose("SMSClientSendActivity: message to be sent: "
// + MessageRepository.toString(m), service.VERBOSE);
// service.put("expected message", MessageRepository.toString(m));
//Actual sending of the SMS
conn.send(m);
service.verbose("message was sent", service.DEBUG);
//UUT notify the PD over the Management Channel that the SMS was sent
service.notify("message sent");
} catch (IOException e) {
throw new DistributedTestException(e.toString( ));
} finally {
// clean up
if (null != conn) {
try {
conn.close( );
} catch (IOException e) {
// ignored
}
}
}
}
//This is the start point of the Activity
public boolean run( ) {
try{
getParameters( );
send( );
//Test was passed, unless during the activity there was a failure
return true;
} catch (DistributedTestException e) {
try {
service.verbose(e.getMessage( ), service.VERBOSE);
} catch (DistributedTestException f) {
// ignored
}
return false;
}
}
}
```

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements JAVA programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for testing a mobile device, comprising method operations of:
    communicating a type of test to a management unit;
    transmitting the type of test from the management unit to a partner device in response to polling by the partner device;
    configuring the partner device in accordance with the type of test;
    communicating data between the partner device and the mobile device as required by the type of test;
    communicating expected data between the partner device and the mobile device via a management unit as required by the type of test; and
    comparing the data and the expected data to determine success of the test.

2. The method of claim 1, wherein the management unit is a hyper text transport protocol (HTTP) server.

3. The method of claim 1, wherein the method operation of configuring the partner device in accordance with the type of test includes activating at least one activity of a partner MIDlet in the partner device.

4. The method of claim 1, wherein the type of test is a send test associated with small message system functionality indicating the mobile device is sending a message to the partner device.

5. The method of claim 1, wherein the type of test is a receive test associated with small message system functionality indicating to the partner device to send a message to the mobile device.

6. The method of claim 1, wherein the mobile device includes at least one activity for running the test.

7. The method of claim 6, wherein the mobile device includes at least one complementary activity to the activity for running the test.

8. A method for testing functionality on a JAVA enabled device, comprising method operations of:
- downloading a test to the JAVA enabled device from a management unit storing the test;
- connecting the management unit with a partner device polling the management unit;
- forwarding a message from the JAVA enabled device to the partner device, through the management unit;
- forwarding expected content of the message from the JAVA enabled device to the partner device, through the management unit; and
- comparing the message to the expected content.

9. The method of claim 8 wherein the method operation of downloading a test to the JAVA enabled device from a management unit storing the test and the method operation of forwarding a message from the JAVA enabled device to the partner device, through the management unit occur over different uniform resource locator (URL) addresses.

10. The method of claim 8, further comprising:
- determining whether the message matches the expected content; and
- if the message matches the expected content the method includes, communicating to the JAVA enabled device through the management unit that the message matches the expected content.

11. The method of claim 8, further comprising:
- downloading a complimentary test to the test to the partner device through the management unit storing the test, the downloading responsive to the forwarding the message from the JAVA enabled device to the partner device.

12. A system for distributed testing, comprising:
a first device;
a second device configured to communicate with the first device;
a testing tool storing tests to be executed between the first device and the second device in order to ascertain whether the first device and the second device can communicate through a communication protocol associated with the tests; and
a management unit providing a hyper text transport protocol (HTTP) communication channel between the first device and the second device, the management unit providing a first uniform resource locator (URL) address for downloading a test and a second URL for communicating results of the test.

13. The system of claim 12, wherein the first device accesses the test and the second device accesses a complimentary test responsive to the test.

14. The system of claim 12, wherein the first device and the second device are JAVA enabled portable electronic devices and the second device is configured to periodically poll the management unit.

15. The system of claim 12, wherein functionality is communicated over a test channel different than the HTTP communication channel.

16. A graphical user interface (GUI) associated with distributed testing performed between portable electronic devices, comprising:
a first region providing a test tree having a plurality of tests defining test functionality to be executed with the portable electronic devices;
a second region configured to illustrate test details associated with one of the plurality of tests selected from the first region;
a third region having control functionality for launching a test engine enabling a first one of the portable electronic devices to connect to a management unit that manages the distributed testing.

17. The GUI of claim 16, wherein the third region includes a play button activating control functionality for initiating the test engine.

18. The GUI of claim 16, wherein an application providing the GUI is a JAVA based application.

19. The GUI of claim 16, wherein the plurality of tests includes a test for a JAVA stack implementation on the portable electronic devices.

20. The GUI of claim 16, wherein in response to the first one of the portable electronic devices connecting to the management unit, a second one of the portable electronic devices downloads a first test and the first one of the portable electronic devices downloads a second test complementary to the first test.

* * * * *